(12) United States Patent
Koishikawa

(10) Patent No.: US 9,302,550 B2
(45) Date of Patent: Apr. 5, 2016

(54) PNEUMATIC TIRE

(71) Applicant: The Yokohama Rubber Co., LTD., Minato-ku, Tokyo (JP)

(72) Inventor: Yoshifumi Koishikawa, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/411,912

(22) PCT Filed: Jul. 22, 2013

(86) PCT No.: PCT/JP2013/069789
§ 371 (c)(1),
(2) Date: Dec. 29, 2014

(87) PCT Pub. No.: WO2014/030476
PCT Pub. Date: Feb. 27, 2014

(65) Prior Publication Data
US 2015/0151584 A1 Jun. 4, 2015

(30) Foreign Application Priority Data

Aug. 20, 2012 (JP) ................. 2012-181707

(51) Int. Cl.
*B60C 11/03* (2006.01)
*B60C 11/12* (2006.01)
(Continued)

(52) U.S. Cl.
CPC . *B60C 11/04* (2013.01); *B60C 5/00* (2013.01); *B60C 11/032* (2013.04); *B60C 11/0304* (2013.04); *B60C 11/0306* (2013.04);
(Continued)

(58) Field of Classification Search
CPC B60C 11/0306; B60C 11/1392; B60C 11/04; B60C 11/13; B60C 2011/0353; B60C 2011/0369; B60C 2011/0381; B60C 11/0304; B60C 11/1315; B60C 11/12; B60C 2011/0346; B60C 2011/0344; B60C 2011/039
See application file for complete search history.

(56) References Cited

U.S. PATENT DOCUMENTS 4,635,694 A     1/1987   Hosokawa
4,884,606 A  * 12/1989   Matsuda et al. ......... 152/209.18
(Continued)

FOREIGN PATENT DOCUMENTS

EP        256247 A2 *   2/1988
JP     S59-176104      10/1984
(Continued)

OTHER PUBLICATIONS

Machine translation for Japan 2010-260404 (no date).*
(Continued)

*Primary Examiner* — Steven D Maki
(74) *Attorney, Agent, or Firm* — Thorpe North & Western

(57) ABSTRACT

A pneumatic tire is configured so that half-tread regions on both sides in the widthwise direction of the tire are provided with: a wave-shaped circumferential main groove group including outer circumferential main grooves and an inner circumferential main groove; land sections; and lug grooves, sipes, or lug groove and sipe combinations formed by combining lug grooves and sipes. The lug grooves are configured in such a manner that, in the half-tread region on the first side, wave-shaped crests are connected at both ends of the land section in the widthwise direction of the tire, and in such a manner that, in the half-tread region on the second side, wave-shaped troughs are connected at both ends of the land section in the widthwise direction of the tire.

18 Claims, 6 Drawing Sheets

(51) Int. Cl.
  *B60C 11/13* (2006.01)
  *B60C 11/04* (2006.01)
  *B60C 5/00* (2006.01)

(52) U.S. Cl.
  CPC ............ *B60C11/12* (2013.01); *B60C 11/13* (2013.01); *B60C 11/1315* (2013.04); *B60C 11/1369* (2013.04); *B60C 11/1392* (2013.04); *B60C 2011/039* (2013.04); *B60C 2011/0344* (2013.04); *B60C 2011/0346* (2013.04); *B60C 2011/0353* (2013.04); *B60C 2011/0365* (2013.04); *B60C 2011/0369* (2013.04); *B60C 2011/0381* (2013.04); *B60C 2011/1209* (2013.04)

(56) References Cited

U.S. PATENT DOCUMENTS

| | | | | |
|---|---|---|---|---|
| 5,924,464 | A | * | 7/1999 | White ................ 152/209.21 |
| 2006/0011279 | A1 | * | 1/2006 | Miyasaka ............ 152/209.15 |
| 2008/0035256 | A1 | * | 2/2008 | Yamane .................. 152/154 |
| 2012/0132333 | A1 | * | 5/2012 | Ebiko et al. ............ 152/209.8 |

FOREIGN PATENT DOCUMENTS

| | | | | |
|---|---|---|---|---|
| JP | 62-015103 | A | * | 1/1987 |
| JP | H06-320913 | | | 11/1994 |
| JP | H07-040712 | | | 2/1995 |
| JP | 07-172110 | A | * | 7/1995 |
| JP | H08-66923 | | | 3/1996 |
| JP | 11-192817 | A | * | 7/1999 |
| JP | 2000-158916 | | | 6/2000 |
| JP | 2003-154527 | A | * | 5/2003 |
| JP | 2010-260404 | A | * | 11/2010 |
| JP | 2012-116389 | | | 6/2012 |
| JP | 2012-153156 | | | 8/2012 |

OTHER PUBLICATIONS

Machine transaltion for Japan 2003-154527 (no date).*
Machine translation for Japan 11-192817 (no date).*
Machine translation for Japan 07-172110 (no date).*
International Search Report for International Application No. PCT/JP2013/069789 dated Oct. 22, 2013, 4 pages, Japan.

* cited by examiner

PNEUMATIC TIRE

TECHNICAL FIELD

The present technology relates to a pneumatic tire provided with a tread pattern.

BACKGROUND

A conventional pneumatic tire is known that is equipped with a plurality of circumferential main grooves extending in the tire circumferential direction, and land portions formed between two circumferential main grooves adjacent to each other in the tire width direction. The region of land portions has a plurality of lug grooves or sipes disposed in the tire circumferential direction, and the lug grooves or sipes communicate with the circumferential main grooves on both sides of the land portions (see Japanese Unexamined Patent Application Publication No. H7-40712A). The tire in Japanese Unexamined Patent Application Publication No. H7-40712A is allegedly able to reduce noise while maintaining wet performance.

However, in the tire of Japanese Unexamined Patent Application Publication No. H7-40712A, due to that a plurality of blocks, which are formed by the land portions being divided in the tire circumferential direction by the lug grooves or the sipes, continuously strike the road surface during traveling, a pattern noise having a peak at a specific frequency occurs easily, thereby deteriorating tire noise performance.

SUMMARY

The present technology provides a pneumatic tire having excellent tire noise performance while securing wet performance during traveling.

A first aspect of the present technology is a pneumatic tire provided with a tread pattern, wherein:

half-tread regions provided on both sides in the tire width direction of a tire center line in a tread pattern include:

a wave-shaped circumferential main groove group having a plurality of circumferential main grooves, the plurality of circumferential main grooves extending in the tire circumferential direction and including an outer circumferential main groove positioned on the outermost side in the tire width direction of the plurality of circumferential main grooves and an inner circumferential main groove positioned on the inner side in the tire width direction relative to the outer circumferential main groove, and the outer circumferential main groove and the inner circumferential main groove both having a fixed groove width and extending in a wave shape in the tire circumferential direction while fluctuating in the tire width direction;

a wave-shaped land portion provided between the inner circumferential main groove and the outer circumferential main groove, having a fixed width in the tire width direction, and extending in the tire circumferential direction while edges fluctuate in the tire width direction due to the wave shape; and a lug groove, a sipe, or a lug groove and sipe combination formed by combining a lug groove and a sipe, that communicates with the outer circumferential main groove and the inner circumferential main groove in a region of the land portion; wherein, the lug groove, the sipe, or the lug groove and sipe combination is configured in such a manner that, in the half-tread region on a first side in the tire width direction, a first crest having the wave shape at one end portion in the tire width direction of the land portion is connected to a second crest having the wave shape at the other end portion in the tire width direction of the land portion, and, in the half-tread region on a second side in the tire width direction, a first trough having the wave shape at one end portion in the tire width direction of the land portion is connected to a second trough having the wave shape at the other end portion in the tire width direction of the land portion, whereby a first length in the extension direction of the lug groove, the sipe, or the lug groove and sipe combination in the half-tread region on the first side is greater than a second length in the extension direction of the lug groove, the sipe, or the lug groove and sipe combination in the half-tread region on the second side.

A tire mounting orientation for mounting toward a vehicle outer side is predetermined for the pneumatic tire, and the first side is preferably disposed on the vehicle outer side.

The pneumatic tire preferably comes into contact with the ground in a state where a camber angle relative to the ground is in a negative camber.

The ratio of the first length on the first side to the second length on the second side preferably satisfies a range of 1.05 to 1.20.

It is preferable that the pneumatic tire be provided with the lug groove and sipe combination in a region of the land portion; that the sipe be provided with a chamfer along an extension direction of the sipe, so that the sipe width is greater toward the tread surface, and the sipe width on the tread surface equals to the groove width of the lug groove; and that an edge where the lug groove adjoins the land portion and an edge where the chamfer adjoins the land portion be continuously connected without a step on the tread surface.

A center position in the direction of the sipe width of the sipe and a center position in the direction of the groove width of the lug groove preferably match at a connection position of the lug groove and the sipe.

It is preferable that the sum of the groove widths of the plurality of circumferential main grooves in the wave-shaped circumferential main groove group provided in the tread pattern satisfy a range of 20 to 35% of a ground contact width; and that bottom portions of the outer circumferential main groove and the inner circumferential main groove have a shape extending in a wave shape in the tire circumferential direction while fluctuating in the tire width direction with a period less than the period of the wave shape.

It is preferable that a shoulder land portion be provided on the outer side in the tire width direction of the outer circumferential main groove, and a shoulder lug groove that does not communicate with the outer circumferential main groove be provided in a region of the shoulder land portion in the half-tread region on the first side.

It is preferable that a shoulder land portion be provided on the outer side in the tire width direction of the outer circumferential main groove, and a shoulder sipe that communicates with the outer circumferential main groove be provided in a region of the shoulder land portion in the half-tread region on the second side The width of the land portion in the half-tread region on the first side preferably equals to the width of the land portion in the half-tread region on the second side.

According to the present technology, a pneumatic tire having excellent tire noise performance while securing wet performance can be obtained.

DETAILED DESCRIPTION

The following is a detailed description of the pneumatic tire according to the present technology.

Figure 1:
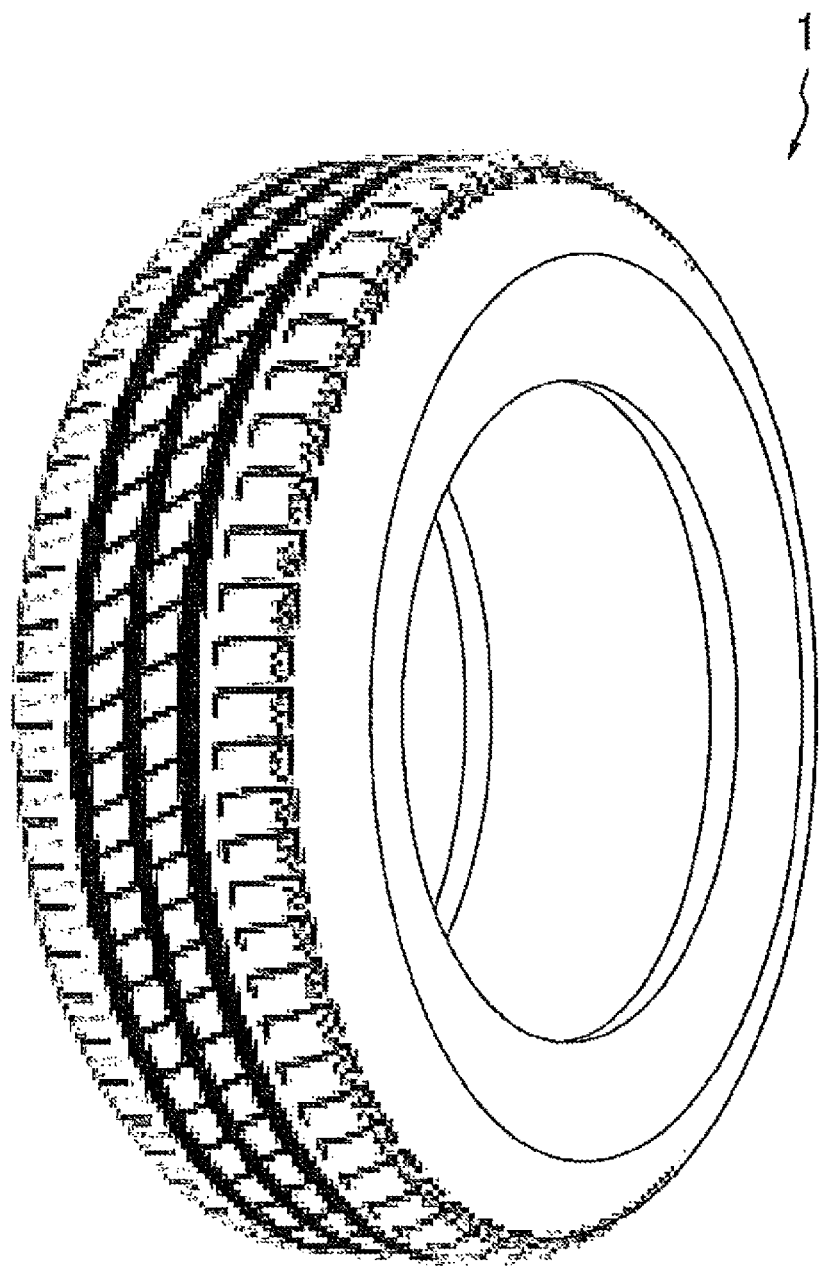
FIG. 1 is a visual appearance view of an entire tire of an embodiment of the present technology.

FIG. 1 illustrates a visual appearance of a pneumatic tire 1 of an embodiment of the present technology.

The pneumatic tire (hereafter referred to as a tire) 1 is a tire for a passenger vehicle.

The structure and rubber members of the tire 1 of the present technology may be either publicly known or novel, and are not particularly limited in the present technology.

Figure 2:
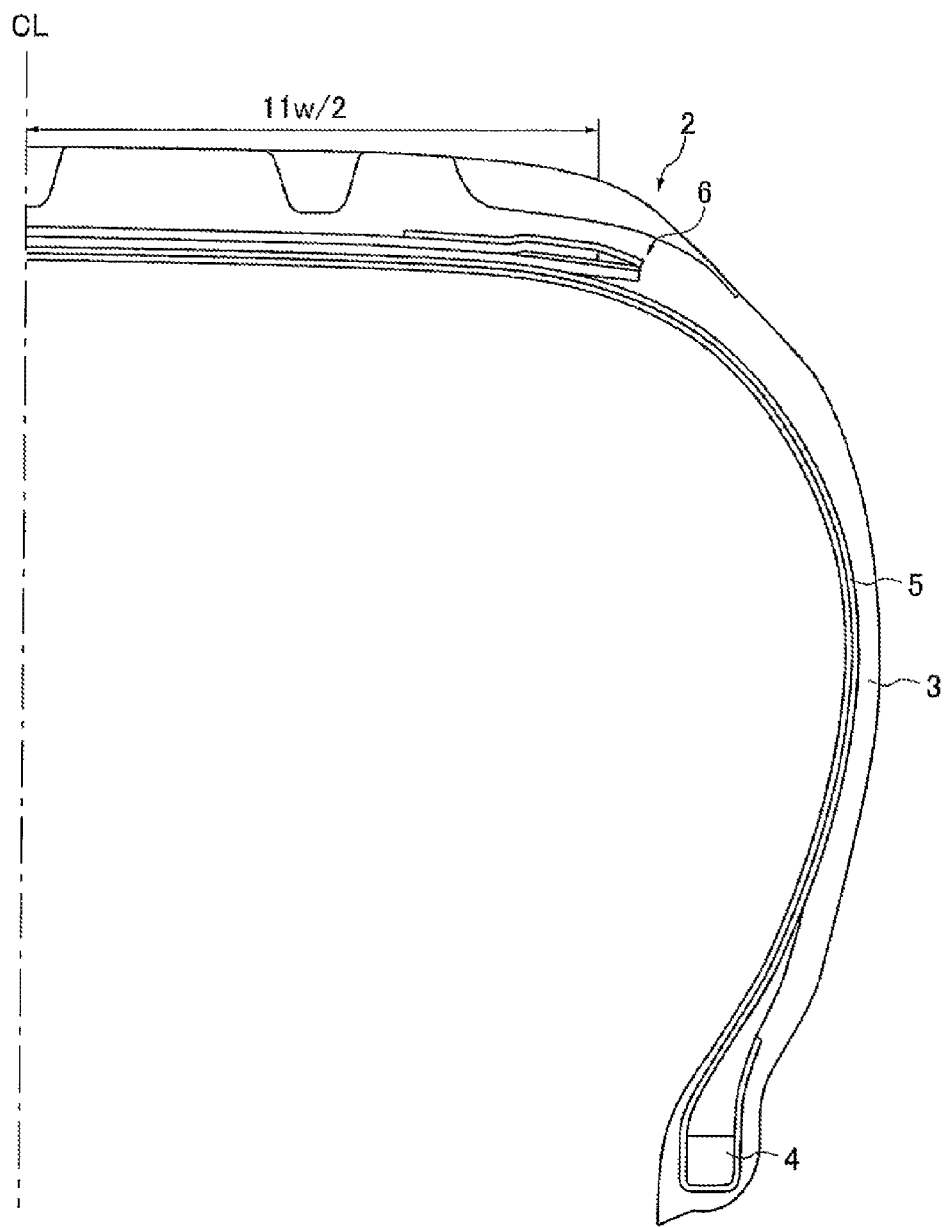
FIG. 2 is a half cross-sectional view of a portion of the tire illustrated in FIG. 1.

As illustrated in FIG. 2, the tire 1 includes a tread portion 2, a side wall 3, a bead 4, a carcass layer 5, and a belt layer 6. FIG. 2 is a half cross-sectional view illustrating a portion of the tire 1. In addition, the tire 1 includes an inner liner layer and the like, that are not illustrated in the drawings. The side wall 3 and the bead 4 are each formed as pairs that are disposed on both sides in the tire width direction so as to sandwich the tread portion 2.

The tread portion 2, the bead 4, the belt layer 6, the inner liner layer, and the like may be either publicly known or novel, and are not particularly limited in the present technology.

Figure 3:
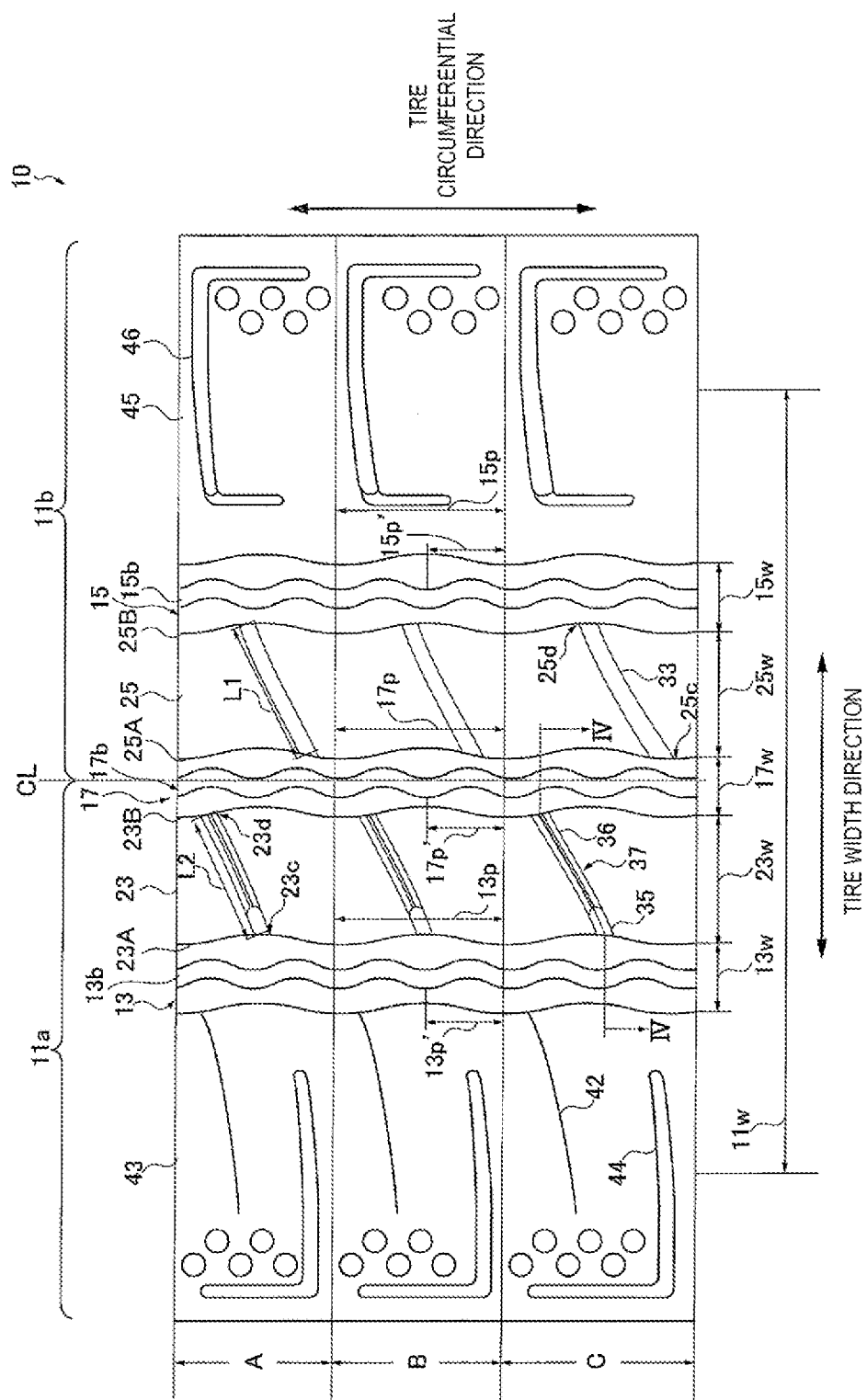
FIG. 3 is a view as seen in plan development view to allow for easy understanding of a tread pattern of the tire of the embodiment.

The tire 1 of the present technology has a tread pattern 10 as a feature of the present technology formed in the tread portion 2 as illustrated in FIG. 3. FIG. 3 is a view as seen in plan development view to allow for easy understanding of the tread pattern 10 of the tire 1 of the present technology. The tire 1 having the tread pattern 10 may be suitably used as a tire for a passenger vehicle. The dimensions of circumferential main grooves, lug grooves, sipes, and lug groove and sipe combinations which are explained below are numerical examples for a tire for a passenger vehicle.

A tire mounting orientation for mounting toward the vehicle outer side is predetermined for the tire 1 of the present technology. In FIG. 3, the reference symbol CL refers to a tire equator line, and a region of the tread pattern 10 on the left side (second side) of FIG. 3 from the tire equator line CL illustrates a half-tread region 11a disposed on the vehicle inner side. The region of the tread pattern 10 on the right side (first side) of FIG. 3 from the tire equator line CL illustrates a half-tread region 11b disposed on the vehicle outer side.

While the tire 1 is mounted on the vehicle, the tread pattern 10 comes into contact with the road surface in a region in the tire width direction indicated by a ground contact width 11w.

Both ground contact edges in the tire width direction that define the ground contact width 11w are determined as follows. Under conditions in which a tire 10 is fitted to a regular rim and inflated to a regular inner pressure, and a load to be applied is 88% of a regular load, the ground contact edges are end portions in the tire width direction of a ground contact patch when the tire 10 is brought into contact with a horizontal plane. Herein, "regular rim" includes a "standard rim" defined by the Japan Automobile Tyre Manufacturers Association Inc. (JATMA), a "design rim" defined by the Tire and Rim Association, Inc. (TRA), and a "measuring rim" defined by the European Tyre and Rim Technical Organisation (ETRTO). While "regular inner pressure" refers to "maximum air pressure" defined by JATMA, the maximum value in "TIRE LOAD LIMITS AT VARIOUS COLD INFLATION PRESSURES" defined by TRA, and "inflation pressures" defined by ETRTO, the regular inner pressure is, for example, 180 kPa for a tire on a passenger vehicle. Note that "regular load" includes "maximum load resistance" defined by JATMA, the maximum value in "tire load limits at various cold inflation pressures" defined by TRA, and "load capacity" defined by ETRTO.

The tire width direction in the present technology refers to a direction of the rotational center axis of the tire 1, and the tire circumferential direction refers to a rotation direction of the rotation surface of the tread surface, the rotation surface being formed when the tire 1 rotates around the tire rotational center axis. The above directions are expressed in FIG. 3. The tire rotation direction of the tread pattern 10 of the present technology is not particularly limited.

The tread pattern 10 illustrated in FIG. 3 illustrates three pitches A to C having different dimensions in the tire circumferential direction, the three pitches A to C being arranged in order of tire circumferential direction length from the pitch A which has the smallest length in the tire circumferential direction. To achieve pitch variation, the tire 1 of the present technology has the pitches A to C disposed, in the tire circumferential direction, in order of pitch length or randomly. In this case, a plurality of pitches having the same pitch length may be disposed consecutively. In the following explanation, the dimensions in the tire circumferential direction are explained using the dimensions belonging to the pitch C as an example.

The tread pattern 10 is provided with a wave-shaped circumferential main groove group having a plurality of circumferential grooves extending in the tire circumferential direction, wave-shaped land portions 23, 25, lug grooves 33, and lug groove and sipe combinations 37.

(Wave-Shaped Circumferential Main Groove Group)

The plurality of circumferential main grooves include outer circumferential main grooves 13, 15 and an inner circumferential main groove 17. The outer circumferential main grooves 13, 15 are circumferential main grooves positioned on the outermost side in the tire width direction among the plurality of circumferential main grooves in the wave-shaped circumferential main groove group. The inner circumferential main groove 17 is a circumferential main groove positioned on the inner side in the tire width direction of the outer circumferential main grooves 13, 15. The inner circumferential main groove 17 is shared by both of the half-tread regions 11a, 11b. The outer circumferential main grooves 13, 15 and the inner circumferential main groove 17 respectively have fixed widths 13w, 15w, 17w in the tire width direction, and extend in a wave shape in the tire circumferential direction while fluctuating in the tire width direction. Due to the wave shape of the outer circumferential main grooves 13, 15 and the inner circumferential main groove 17, the edge lengths are greater than those in a straight shape in which the circumferential main grooves extend linearly in the tire circumferential direction, thereby enhancing wet performance such as anti-hydroplaning performance while traveling on wet road surfaces. The groove widths 13w, 15w, 17w may be equal to each other or may be different from each other.

The sum of the respective groove widths 13w, 15w, 17w of the outer circumferential main grooves 13, 15 and the inner circumferential main groove 17 preferably satisfies a range of 20 to 35% of the ground contact width 11w. Sufficient water discharge performance can be achieved and wet performance is enhanced due to the sum of the groove widths 13w, 15w, 17w being equal to or greater than 20% of the ground contact width 11w. An increase in tire noise can be suppressed due to the sum of the groove widths 13w, 15w, 17w being equal to or less than 35% of the ground contact width 11w. Moreover, the stiffness of the block-shaped land portions 23, 25 aligned in the tire circumferential direction can be secured.

The outer circumferential main grooves 13, 15 and the inner circumferential main groove 17 respectively have bottom portions 13b, 15b, 17b which are recessed toward the tire inner periphery. The bottom portions 13b, 15b, 17b preferably have a shape extending in a wave shape in the tire circumferential direction while fluctuating in the tire width direction at periods 13p', 15p' 17p' which are less than periods 13p, 15p, 17p of the wave shapes of the outer circumferential main grooves 13, 15 and the inner circumferential main groove 17. According to this configuration, the periods of the wave shapes of the outer circumferential main grooves 13, 15 and the inner circumferential main groove 17 are reduced toward the respective bottom portions 13b, 15b, 17b, and the edge lengths become greater accompanying the development of wear of the tire 1, whereby a reduction in wet performance due to the development of wear can be suppressed.

The periods 13p, 15p, 17p of the outer circumferential main grooves 13, 15 and the inner circumferential main groove 17 may be equal to each other or may be different from each other. If the periods 13p, 15p, 17p of the outer circumferential main grooves 13, 15 and the inner circumferential main groove 17 equal to each other, the wave shapes are preferably synchronized with each other in the tire circumferential direction from the point of view of allowing the land portions 23, 25 to extend in a wave shape in the tire circumferential direction and allowing each pitch to have the same phase; however, the wave shapes may not be synchronized with each other. While fluctuating in the tire width direction for one period within one pitch, the outer circumferential main grooves 13, 15 and the inner circumferential main groove 17 may fluctuate in the tire width direction for less than one period or greater than one period.

The periods 13p', 15p', 17p' of the respective bottom portions 13b, 15b, 17b of the outer circumferential main grooves 13, 15 and the inner circumferential main groove 17 may be equal to each other or may be different from each other. If the periods 13p', 15p', 17p' of the respective bottom portions 13b, 15b, 17b of the outer circumferential main grooves 13, 15 and the inner circumferential main groove 17 are equal to each other, the wave shapes are preferably synchronized with each other from the point of view of allowing the land portions 23, 25 to extend in a wave shape in the tire circumferential direction and allowing each pitch to have the same phase even if tire wear develops; however, the wave shapes may not be synchronized with each other. While fluctuating in the tire width direction for two periods within one pitch, the bottom portions 13b, 15b, 17b of the outer circumferential main grooves 13, 15 and the inner circumferential main groove 17 may fluctuate in the tire width direction for less than two periods or greater than two periods.

In another embodiment, any of the plurality of circumferential main grooves in the wave-shaped circumferential main groove group may have a bottom portion having a period less than the period of the wave shape. Alternatively, at least any of the plurality of circumferential main grooves in the wave-shaped circumferential main groove group may have a bottom portion having a period equal to or greater than the period of the wave shape. Furthermore, chamfers (not illustrated in FIG. 3) are preferably formed on edge portions which are formed on the tread surface by the circumferential main grooves 13, 15, 17 from the point of view of increasing ground contact pressure to improve wet performance.

(Land Portions)

The land portion 23 is provided between the inner circumferential main groove 17 and the outer circumferential main groove 13, has a fixed width 23w in the tire width direction, and has a shape extending in the tire circumferential direction while both edges 23A, 23B in the tire width direction fluctuate in the tire width direction due to the wave shapes of the inner circumferential main groove 17 and the outer circumferential main groove 13. Accordingly, a plurality of troughs 23d and 23c that constitute the wave shapes are formed in the land portion 23.

The land portion 25 is provided between the inner circumferential main groove 17 and the outer circumferential main groove 15, has a fixed width 25w in the tire width direction, has a wave shape extending in the tire circumferential direction while both edges 25A, 25B in the tire width direction fluctuate in the tire width direction due to the wave shapes of the inner circumferential main groove 17 and the outer circumferential main groove 15. Accordingly, a plurality of crests 25d and 25c that constitute the wave shapes are formed in the land portion 25.

The widths 23w, 25w of the land portions 23, 25 are preferably equal to each other. Accordingly, weight deviation between the vehicle inner side and the vehicle outer side, or the like is suppressed, and conicity is improved. Moreover, the balance between a reduction in tire noise and an enhancement in wet performance can be maintained at a high level. Moreover, the tread pattern 10 can be designed more easily to allow a first length L1 described below to be greater than a second length L2. The wave shapes of the land portions 23, 25 are preferably synchronized with each other from the point of view of uniformity, but also may not be synchronized with each other.

(Lug Grooves, Sipes, and Lug Groove and Sipe Combinations)

In the present technology, the lug grooves have a groove width of 1.5 mm or more, and a groove depth of 5 mm or more. The sipes have a width less than 1.5 mm in the present technology.

The lug grooves 33 communicate with the outer circumferential main groove 15 and the inner circumferential main groove 17 in the region of the land portion 25. A plurality of lug grooves 33 are provided in the land portion 25, and one lug groove 33 is provided for every pitch. The lug groove 33 connects a crest 25d (first crest) and a crest 25c (second crest) of the land portion 25. The crests 25c, 25d are convex portions that protrude toward the inner circumferential main groove 17 or toward the outer circumferential main groove 15 to form the wave shape in both end portions in the tire width direction of the land portion 25. Because the crest 25d and the crest 25c are sections of the land portion 25 furthest from each other in the tire width direction, the length (first length in the extension direction of the lug groove 33) L1 of the lug groove 33 that connects the crest 25d and the crest 25c is increased, whereby water discharge performance is enhanced on the vehicle outer side. L1 is the length of the center line (not illustrated) that runs along the center of the groove width of the lug groove 33. The lug groove 33 may not connect the crest 25*d* and the crest 25*c* when the tire 1 is worn out.

In the present embodiment, the lug groove 33 connects the crest 25*d* and the crest 25*c* that are closest to each other and is inclined, relative to the tire width direction, in a direction that is shifted by a half pitch in the tire circumferential direction. However, the lug groove 33 is not limited to such a connection manner, and may connect a crest 25*d* and a crest 25*c* other than the crest 25*d* and the crest 25*c* that are closest to each other and may have a greater inclination relative to the tire width direction. Further, a plurality of lug grooves 33 may be provided in one pitch if the outer circumferential main grooves 13, 15 and the inner circumferential main groove 17 fluctuate in the tire width direction for a plurality of periods within one pitch. The lug groove 33 may not connect the section of the crest 25*d* that protrudes furthest toward the outer circumferential main groove 15 and the section of the crest 25*c* that protrudes furthest toward the inner circumferential main groove 17.

The lug groove and sipe combination 37 is a combination of a lug groove 35 and a sipe 36 and communicates with the outer circumferential main groove 13 and the inner circumferential main groove 17 in the region of the land portion 23. Details of the lug groove 35 and the sipe 36 are discussed below. A plurality of groove and sipe combinations 37 are provided in the land portion 23 and one lug groove and sipe combination 37 is provided for every pitch. The lug groove and sipe combination 37 connects a trough 23*d* (first trough) and a trough 23*c* (second trough) in the land portion 23. The troughs 23*c*, 23*d* are concave portions which are recessed in the opposite direction with respect to the outer circumferential main groove 13 or the inner circumferential main groove 17 so as to form the wave shape on both end portions in the tire width direction of the land portion 23. Because the trough 23*d* and the trough 23*c* are sections of the land portion 23 that are closest to each other in the tire width direction, the length (second length in the extension direction of the lug groove and sipe combination 37) L2 of the lug groove and sipe combination 37 that connects the trough 23*d* and the trough 23*c* is less than the length L1 described above. Accordingly, the length L2 has a different length than the length L1 of the lug groove 33 described above; therefore a frequency of pattern noise generated in the portion of the lug groove 33 or the lug groove and sipe combination 37 can be diffused, tire noise on the vehicle inner side can be suppressed, and quietness inside the vehicle can be enhanced. In particular when the camber angle of the vehicle wheel is inclined in the negative direction, that is, when the vehicle wheel is in contact with the ground with the camber angle in a negative camber state, the lug groove and sipe combination 37 having the shorter length L2 is effective because pattern noise is generated more easily due to the load being applied larger on the vehicle inner side. The length L2 is the length of center positions 35C, 36C described below (see FIGS. 4 and 6) that run along the center of the groove width of the lug groove and sipe combination 37. The lug groove and sipe combination 37 may not connect the trough 23*d* and the trough 23*c* when the tire 1 is worn out.

In the present embodiment, the lug groove and sipe combination 37 connects the trough 23*d* and the trough 23*c* that are closest to each other, and is inclined, relative to the tire width direction, in a direction that is shifted by a half-pitch in the tire circumferential direction. However, the lug groove and sipe combination 37 is not limited to such a connection manner, and may connect a trough 23*d* and a trough 23*c* other than the trough 23*d* and the trough 23*c* that are closest to each other and may have a greater inclination relative to the tire width direction. Further, a plurality of lug groove and sipe combinations 37 may be provided in one pitch if the outer circumferential main grooves 13, 15 and the inner circumferential main groove 17 fluctuate in the tire width direction for a plurality of periods within one pitch. Moreover, the lug groove and sipe combination 37 may not connect the section of the trough 23*d* that is recessed most toward the outer circumferential main groove 13 and the section of the trough 23*c* that is recessed most toward the inner circumferential main groove 17.

In the present embodiment, the length L1 of the lug groove 33 is greater than the second length L2 of the lug groove and sipe combination 37. Due to the lengths L1, L2 being different from each other in this way, the frequencies of the respective pattern noises generated in the land portions 23, 25 are different, and the distribution of the frequencies of the noises is diffused as a whole, whereby tire noise can be suppressed. By providing the lug grooves 33 that are longer than the lug groove and sipe combinations 37 in the half-tread region 11*b* on the first side in the present embodiment, water discharge performance on the vehicle outer side can be enhanced, and by providing the lug groove and sipe combinations 37 that are shorter than the lug grooves 33 in the half-tread region 11*a* on the second side, tire noise can be reduced on the vehicle inner side where the functions that lead to the generation of pattern noise are desirably smaller than the vehicle outer side.

The ratio L1/L2 of the length L1 of the lug groove 33 to the length L2 of the lug groove and sipe combination 37 preferably satisfies a range of 1.05 to 1.20. The balance between the reduction in tire noise and the enhancement in wet performance can be maintained at a higher level by keeping the ratio L1/L2 within the above range.

Figure 5:
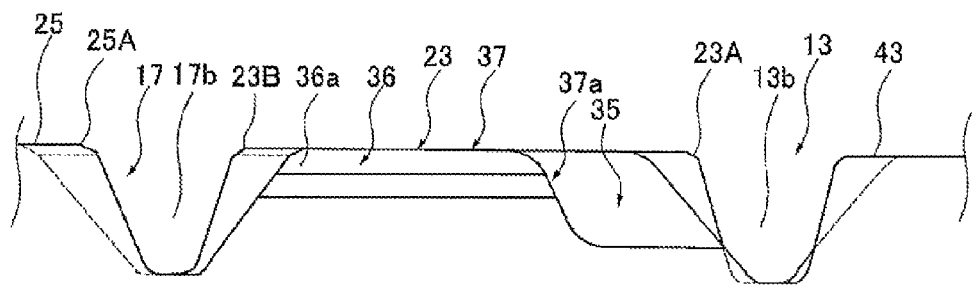
FIG. 5 is a cross-sectional view along the line IV-IV illustrated in FIG. 3 of the tread surface of the tire of the embodiment.
Figure 6:
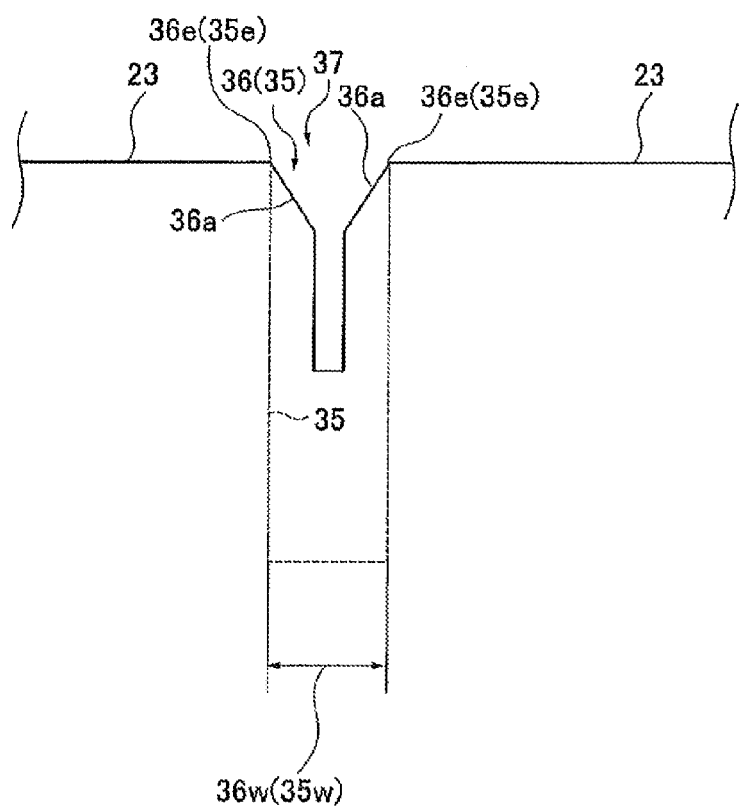
FIG. 6 is a cross-sectional view along the line V-V illustrated in FIG. 4 of the tread surface of the tire of the embodiment.

The lug groove 35 and the sipe 36 of the lug groove and sipe combination 37 will now be described in detail with reference to FIGS. 4 to 6.

Figure 4:
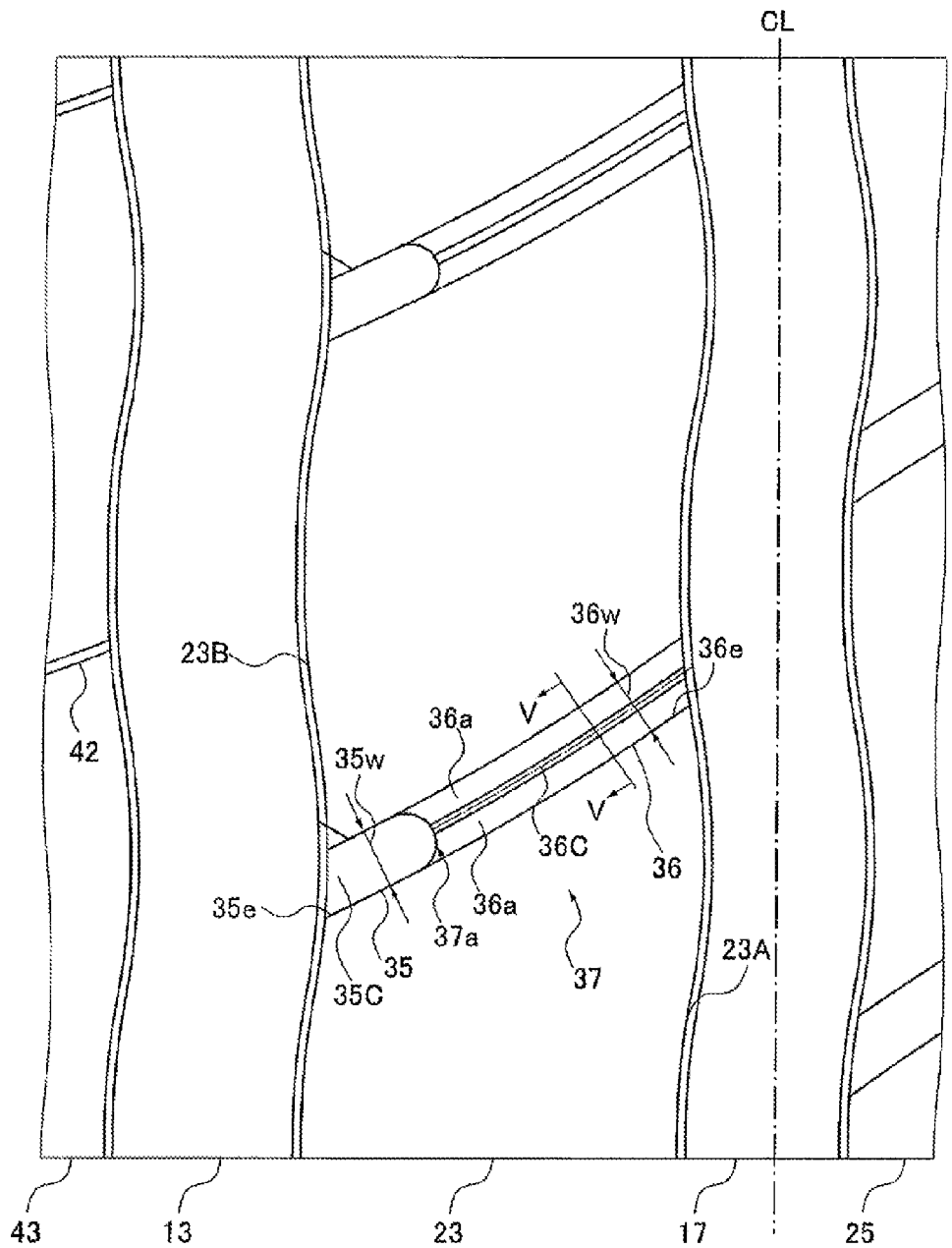
FIG. 4 is an enlarged view of the tread pattern illustrated in FIG. 3 with a focus on a lug groove and sipe combination.

FIG. 4 is an enlarged view of the tread pattern illustrated in FIG. 3 with a focus on the lug groove and sipe combination 37. The illustrations of the respective bottom portions 13*b*, 17*b* of the outer circumferential main groove 13 and the inner circumferential main groove 17 are omitted in FIG. 4. FIG. 5 is a cross-sectional view along the line IV-IV illustrated in FIG. 3 of the tread surface of the tire of the present embodiment. FIG. 6 is a cross-sectional view along the line V-V illustrated in FIG. 4 of the tread surface of the tire of the present embodiment. The reference numerals in brackets in FIG. 6 refer to elements of the lug groove 35 that are in the same position as the reference numerals shown outside the brackets and that are positioned further to the rear in the drawing.

The lug groove and sipe combination 37 is formed by the lug groove 35 and the sipe 36 being connected at a connection position 37*a*. The lug groove 35 is provided on the outer circumferential main groove 13 side and has a groove width 35*w*. The sipe 36 is provided on the inner circumferential main groove 17 side. The sipe 36 has a chamfer 36*a* provided on an edge 36*e* adjoining the land portion 23. The chamfer 36*a* is provided along the extension direction of the sipe 36. A sipe width 36*w* is greater on the tread surface due to the chamfer 36*a*, and the sipe width 36*w* equals to the groove width 35*w* of the lug groove 35. Due to the chamfer 36*a* being provided in this way, the ground contact pressure increases and wet performance can be enhanced. The lug groove 35 having the larger groove volume is disposed on the vehicle inner side, and the sipe 36 having the smaller groove volume is disposed on the vehicle outer side, whereby tire noise on the vehicle outer side is reduced.

The chamfer 36*a* of the sipe 36 preferably has a depth satisfying a range of 0.5 to 3.0 mm. Due to the depth of the chamfer 36a being equal to or greater than 0.5 mm, the ground contact pressure can be sufficiently increased and wet performance can be enhanced, and due to the chamfer 36a being equal to or less than 3.0 mm, the stiffness of the land portion 23 can be secured and wet performance can be enhanced. The chamfer 36a of the sipe 36 preferably has the sipe width 36w satisfying a range of 1.0 to 5.0 mm, or more preferably a range of 1.5 to 5.0 mm. Due to the sipe width 36w being equal to or more than 1.0 mm, the ground contact pressure can be sufficiently increased and wet performance can be enhanced, and due to the sipe width 36w being equal to or less than 5.0 mm, the stiffness of the land portion 23 can be secured and wet performance can be enhanced.

An edge 35e where the lug groove 35 adjoins the land portion 23, and the edge 36e where the chamfer 36a adjoins the land portion 23 are preferably continuously connected without a step on the tread surface. The groove width 35w of the lug groove 35 equals to the sipe width 36w, so that no step with the sipe 36 is present, water flows more easily, and water discharge performance is improved.

The center position 36C in the direction of the sipe width 36W of the sipe 36, and the center position 35C in the direction of the groove width 35w of the lug groove 35, preferably match at the connection position 37a. Accordingly, water flows more easily and water discharge performance is improved.

A chamfer is preferably provided in a portion that adjoins the edge 35e, the edge 35e adjoining the land portion 23, of the lug groove and sipe combination 37 in order to prevent chipping of the land portion 23 and to increase the ground contact pressure and enhance wet performance.

(Shoulder Land Portions)

The tread pattern 10 is preferably further provided with shoulder land portions 43, 45 as illustrated in FIG. 3. The shoulder land portion 43 is provided on the outer side in the tire width direction of the outer circumferential main groove 13 in the half-tread region 11a. The shoulder land portion 45 is provided on the outer side in the tire width direction of the outer circumferential main groove 15 in the half-tread region 11b.

(Shoulder Lug Grooves)

The tread pattern 10 is preferably further provided with shoulder lug grooves 44, 46 as illustrated in FIG. 3. The shoulder lug groove 44 is provided in the region of the shoulder land portion 43 in the half-tread region 11a and does not communicate with the outer circumferential main groove 13. The shoulder lug groove 46 is provided in the region of the shoulder land portion 45 in the half-tread region 11b and does not communicate with the outer circumferential main groove 15. Due to the shoulder lug grooves 44, 46 not communicating with the respective outer circumferential main grooves 13, 15 in this way, pass-by noise can be reduced.

(Shoulder Sipes)

The tread pattern 10 is preferably further provided with shoulder sipes 42 as illustrated in FIG. 3. The shoulder sipes 42 are provided in the region of the shoulder land portion 43 in the half-tread region 11a and communicate with the outer circumferential main groove 13. By allowing the shoulder sipes 42 to communicate with the outer circumferential main groove 13 in this way, uneven wear resistance on the vehicle inner side can be enhanced, and water discharge performance on the vehicle inner side can be improved, thereby enhancing wet performance.

Examples of the dimensions of the elements for the tire 1 described above will be provided below.

The respective groove widths 13w, 15w, 17w of the outer circumferential main grooves 13, 15 and the inner circumferential main groove 17 may be equal to each other or may be different from each other, and satisfy a range of 5 to 15 mm, or preferably a range of 8 to 12 mm (e.g., 10 mm). The respective widths 23w, 25w of the land portions 23, 25 may be equal to each other or may be different from each other, and satisfy a range of 15 to 30 mm, or preferably a range of 20 to 25 mm (e.g., 23 mm).

The length L1 of the lug groove 33 that connects the crest 25c and the crest 25d satisfies a range of 20 to 50 mm, or preferably a range of 25 to 35 mm (e.g., 30 mm). The length L2 of the lug groove and sipe combination 37 that connects the troughs 23c, 23d satisfies a range of 18 to 48 mm, or preferably a range of 23 to 33 mm (e.g., 28 mm). The ratio L1/L2 between the length L1 of the lug groove 33 and the length L2 of the lug groove and sipe combination 37 is preferably 1.13.

The groove width 35w of the lug groove 35 and the sipe width 36w of the sipe 36 in the lug groove and sipe combination 37 satisfy a range of 1.5 to 5.0 mm, or preferably a range of 2.0 to 4.0 mm (e.g., 3.0 mm). The sipe width of the sipe 36 of the lug groove and sipe combination 37 in a case of the groove depth where the chamfer 36a is not formed satisfies a range of no less than 0.5 mm and less than 1.5 mm, or preferably a range of 0.6 to 0.8 mm (e.g., 0.7 mm).

The sum of the groove widths 13w, 15w, 17w satisfies a range of 20 to 40 mm, or preferably a range of 30 to 35 mm (e.g., 33 mm). The ground contact width 11w satisfies a range of 120 to 140 mm, or preferably a range of 125 to 135 mm (e.g., 130 mm). The percentage of the sum of the groove widths 13w, 15w, 17w with respect to the ground contact width 11w preferably satisfies a range of 22 to 28% (e.g., 25%).

The periods of wave shapes 13p, 15p, 17p of the outer circumferential main grooves 13, 15 and the inner circumferential main groove 17 may be equal to each other or may be different from each other, and satisfy a range of 10 to 20 mm, or preferably a range of 12 to 18 mm (e.g., 15 mm). The periods of wave shapes 13p', 15p', 17p' of the bottom portions 13b, 15b, 17b of the outer circumferential main grooves 13, 15 and the inner circumferential main groove 17 may be equal to each other or may be different from each other, and satisfy a range of 5 to 15 mm, or preferably a range of 8 to 12 mm (e.g., 10 mm).

According to the pneumatic tire 1 described above, due to pattern noises with different frequencies being generated in the half-tread region 11a and the half-tread region 11b brought about by making the length L1 of the lug groove 33 and the length L2 in the extension direction of the lug groove and sipe combination 37 different from each other, the frequencies of the pattern noises can be diffused throughout the entire tire 1, thereby reducing tire noise. By making the length L1 of the lug groove 33 greater than the length L2 of the lug groove and sipe combination 37 in the tire 1, water discharge performance in the half-tread region 11b is enhanced, wet performance is enhanced, tire noise in the half-tread region 11a is suppressed, and quietness in the interior of the vehicle is enhanced. Moreover, due to all of the outer circumferential main grooves 13, 15 and the inner circumferential main groove 17 being formed in a wave shape in the tire 1, the edge lengths are greater than those of straight main grooves that extend linearly in the tire circumferential direction, and thus wet performance is excellent. The tire 1 in this way demonstrates excellent tire noise performance while securing wet performance.

By mounting the tire 1 so that the half-tread region 11b is disposed on the vehicle outer side, water discharge performance on the vehicle outer side is enhanced, tire noise on the vehicle inner side is suppressed, and excellent quietness inside the vehicle is achieved while securing wet performance.

In the tire 1, the balance between the reduction in tire noise and the enhancement in wet performance can be maintained at a higher level by making the ratio L1/L2 of the length L1 of the lug groove 33 and the length L2 of the lug groove and sipe combination 37 to satisfy a range of 1.05 to 1.20.

Additionally, in the tire 1, water discharge performance is enhanced by making the sipe width 36w of the sipe 36 and the groove width 35w of the lug groove 35 in the lug groove and sipe combination 37 equal to each other, and by continuously connecting the edge 35e where the lug groove 35 adjoins the land portion 23, and the edge 36e where the chamfer 36a of the sipe 36 adjoins the land portion 23 without a step. By matching the center position 36C in the sipe width 36w direction of the sipe 36 and the center position 35C in the groove width 35w direction of the lug groove 35 at the connection position 37a of the lug groove 35 and the sipe 36, water discharge performance is also enhanced.

By making the sum of the groove widths 13w, 15w, 17w of the plurality of circumferential main grooves in the wave-shaped circumferential main groove group to satisfy a range of 20 to 35% of the ground contact width 11w, a reduction in the stiffness of the land portions 23, 25 can be suppressed while securing sufficient water discharge performance. By making the periods 13p', 15p', 17p' of the bottom portions 13b, 15b, 17b of the outer circumferential main grooves 13, 15 and the inner circumferential main groove 17 less than the periods of wave shapes 13p, 15p, 17p, the edge length increases accompanying the development of wear of the tire 1, and a reduction in wet performance due to the development of wear can be suppressed.

Tire noise can be reduced by providing the shoulder lug grooves 44, 46 that do not communicate with the outer circumferential main grooves 13, 15 in the region of the shoulder land portions 43, 45 located on the outer side in the tire width direction. Both uneven wear resistance and wet performance can be enhanced by providing the shoulder sipes 42 that communicate with the outer circumferential main groove 13 in the region of the shoulder land portion 43 located on the outer side in the tire width direction.

(Other Embodiments)

Figure 7:
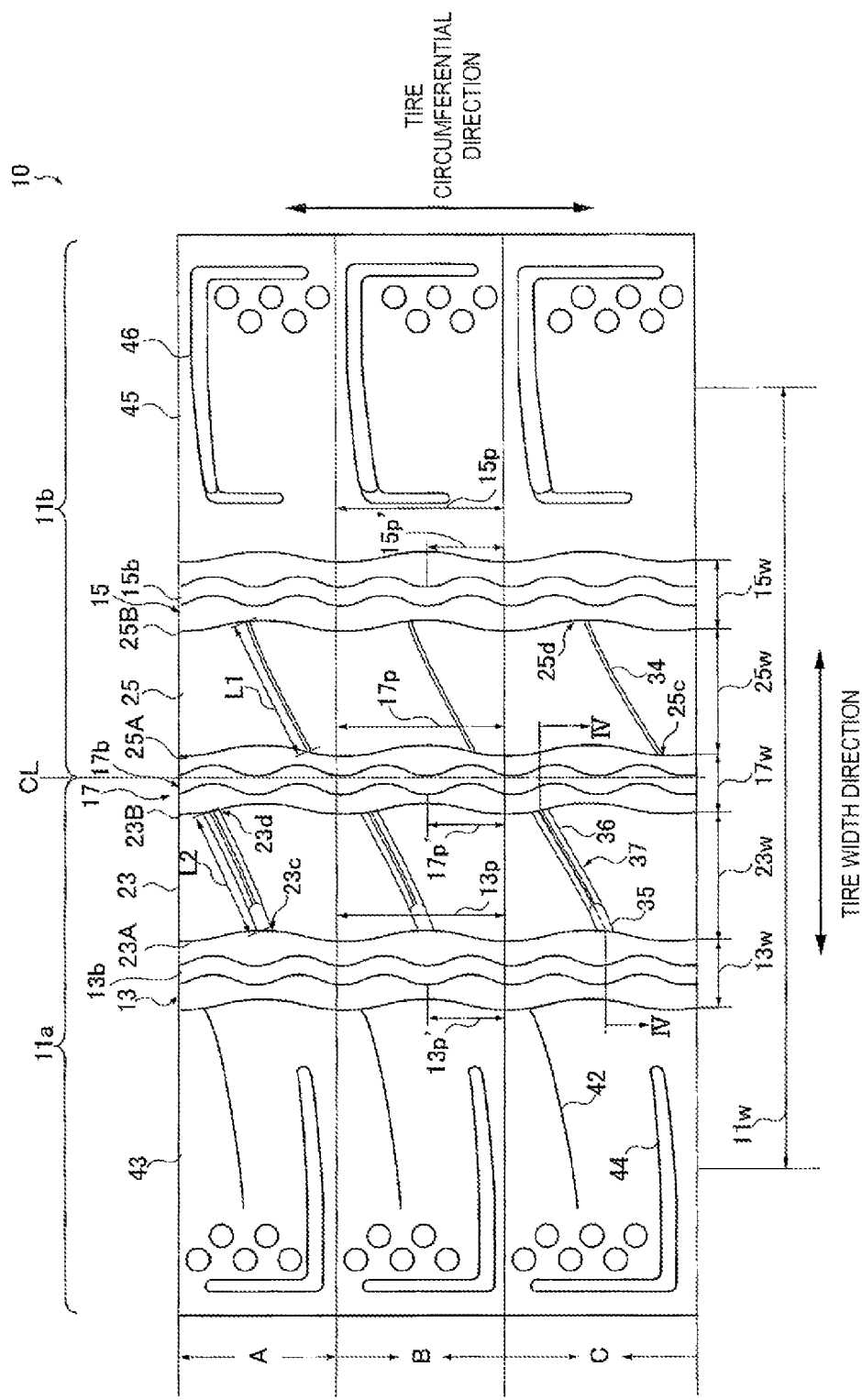
FIG. 7 is a view as seen in plan development view to allow for easy understanding of a tread pattern of a tire of another embodiment.

The crests 25c, 25d in the tread pattern of the tire of the present technology may be connected by sipes 34 in place of the lug grooves 33 as illustrated in FIG. 7. FIG. 7 is a view, as seen in plan development view, of a tread pattern of the tire of another embodiment of the present technology. Elements in FIG. 7 having the same reference numerals as the elements illustrated in FIG. 1 are configured in the same way as described in the above embodiment. Although not illustrated, the sipes 34 may be provided with chamfers that lead to an increase in the widths of the sipes 34 on the tread surface in the same way as the chamfers 36a of the sipes 36. The ground contact pressure is increased and wet performance is enhanced due to the provision of the chamfers on the sipes 34.

According to this tread pattern, due to pattern noises with different frequencies being generated in the half-tread region 11a and the half-tread region 11b brought about by making the length of the sipe 34 greater than the length L2 of the lug groove and sipe combination 37 in the same way as in the pneumatic tire 1 described above, the frequencies of the pattern noises can be diffused throughout the entire tire 1, thereby reducing tire noise. The troughs 23c, 25d may be connected to each other by other sipes in place of the lug groove and sipe combinations 37 in the tread pattern 10 illustrated in FIG. 7, and in this case the lug grooves 33 may be used in place of the sipes 34.

Four or more circumferential main grooves may be provided in the present technology. n (where n is a natural number of 4 or greater) circumferential main grooves include two outer circumferential main grooves and n−2 inner circumferential main grooves, and the tread pattern is provided with two outer land portions provided between the inner circumferential main grooves and the outer circumferential main grooves, and n−3 inner land portions provided between two adjacent inner circumferential main grooves. The inner land portions may be defined in the tire circumferential direction by the lug grooves, the sipes, or the lug groove and sipe combinations that connect the crests or the troughs on either side of the land portions in the same way as the lug groove and sipe combinations 37 and the lug grooves 33 provided in the land portions 23, 25 of the above embodiment, and may be provided with the lug grooves, the sipes, or the lug groove and sipe combinations that connect the crests and the troughs on either side of the land portions. Alternatively, the inner land portions may be provided with the lug grooves, the sipes, or the lug groove and sipe combinations that do not communicate with either one of the inner circumferential main grooves, or may not be provided with the lug grooves, the sipes, or the lug groove and sipe combinations. If four or more circumferential main grooves are present, an inner circumferential main groove which overlaps the tire center line may be present or not.

In the present technology, the lengths in the tire width direction of the plurality of land portions provided between the outer circumferential main grooves and the inner circumferential main grooves may be equal to each other or may be different from each other.

Crests on either side in the tire width direction of the land portion 23 may be connected together, and troughs on either side in the tire width direction of the land portion 25 may be connected together in the above tread pattern 10.

The tread pattern 10 may be provided with a straight main groove that does not belong to the wave-shaped circumferential main groove group and extends linearly in the tire circumferential direction.

The tire 1 of the present technology may be mounted so that the second side thereof faces toward the vehicle outer side.

In this case also, because the lengths L1 and L2 are different from each other, which brings about pattern noises having different frequencies, the frequencies can be diffused, thereby suppressing tire noise in the same way as in the present embodiment.

The ratio L1/L2 between the first length L1 on the first side and the second length L2 on the second side may be less than 1.05 or may be greater than 1.20.

In the above embodiment, the sipe in the lug groove and sipe combination may not have a chamfer. The lug groove and the sipe in the lug groove and sipe combination may be connected with a step. Moreover, the center position in the sipe width direction of the sipe and the center position in the groove width direction of the lug groove may not match at the connection position between the lug groove and the sipe in the lug groove and sipe combination.

In the above embodiment, the sum of the groove widths of the plurality of circumferential main grooves in the wave-shaped circumferential main groove group provided in the tread pattern may be less than 20% of the ground contact width or may be greater than 35%. The bottom portions of the outer circumferential main grooves and the inner circumferential main grooves may not have a shape extending in the tire circumferential direction in a wave shape while fluctuating in the tire width direction with a period less than the period of the wave shape.

In the above embodiment, the shoulder lug groove that does not communicate with the outer circumferential main groove may not be provided in the region of the shoulder land portion in the half-tread region on the first side.

In the above embodiment, while the shoulder sipe 42 that communicates with the outer circumferential main groove 13 is provided only in the shoulder land portion 43 on one of the outer sides in the tire width direction, a shoulder sipe that communicates with the outer circumferential main groove 15 may b e provided in the shoulder land portion 45 on the other outer side in the tire width direction. The shoulder sipe may not be provided in either of the shoulder land portions 43, 45.

The wave-shaped circumferential main grooves in the tread pattern of the present technology are preferably disposed within a region that is 80% of the length in the tire width direction between the tire equator line CL and the pattern end in the tire width direction from the tire equator line CL.

The tire having the tread pattern of the present technology may be provided with one or a plurality of dimple-shaped recesses. The recesses are provided, for example, between two adjacent shoulder lug grooves 44, 46 in the tire circumferential direction in a section of the tire on the inner side of the pattern end as well as on the outer side of the ground contact edge.

WORKING EXAMPLES

Test tires were manufactured to study the effects of the tread pattern 10 of the tire 1 of the present technology.

inverse of the measured values and expressing the values as an index with the inverse of the measured value for Comparative Example 3 as 100. A larger index value indicates superior noise performance. An index value of 103 or more was evaluated as an improvement in tire noise performance.

For wet performance, the average lateral acceleration was measured after traveling for 5 laps at a limited speed on an R30 (radius 30 m) turning course of an outdoor tire testing facility having a wet road surface of water depth 1 mm. The evaluation was carried out by taking the inverse of the measured values and expressing the values as an index with the inverse of the measured value for Comparative Example 3 as 100. A larger index value indicates superior wet performance. An index value of 100 or more was evaluated as securing wet performance.

The evaluation results are shown in Tables 1 to 5. Tires with L1/L2=1.13 were used in comparative examples and working examples in Table 1 and Tables 3 to 5.

"Lug groove or the like" indicates a lug groove, a sipe, or a lug groove and sipe combination in Tables 1 to 5. Connection manners described in the "Outer side when mounted on vehicle" and "Inner side when mounted on vehicle" rows indicate connection manners of the lug grooves or the like in the land portions 25 and 23. "Trough-Trough" indicates a state where troughs on either side in the tire width direction of the land portion are connected, "Crest-Crest" indicates a state where crests on either side in the tire width direction of the land portion are connected, "Crest-Trough" indicates a state where a crest and a trough on either side in the tire width direction of the land portion are connected.

TABLE 1

|  |  | Comparative Example 1 | Comparative Example 2 | Comparative Example 3 | Working Example 1 | Working Example 2 |
| --- | --- | --- | --- | --- | --- | --- |
| Main groove shape |  | Wave shape | Wave shape | Wave shape | Wave shape | Wave shape |
| Connection manner of lug grooves or the like | Outer side when mounted on vehicle | Trough - Trough | Crest - Crest | Crest - Trough | Crest - Crest | Trough - Trough |
|  | Inner side when mounted on vehicle | Trough - Trough | Crest - Crest | Crest - Trough | Trough - Trough | Crest - Crest |
| Tire noise performance |  | 110 | 95 | 100 | 108 | 103 |
| Wet performance |  | 95 | 110 | 100 | 105 | 106 |

The tire size was 195/65R15. Tires with a rim size of 15×6.0 J were manufactured, the tires being provided with tread patterns according to the specifications described in the following Tables 1 to 5. Specifications other than the specifications described in Tables 1 to 5 are the same as the tread pattern illustrated in FIG. 3. An FF vehicle with an engine displacement of 2 liters was used as a vehicle for studying tire performance. The inner pressure of all of the front wheels and the rear wheels was set to 230 kPa. The lengths of the land portions 23, 25 in the tire width direction were made equal to each other.

Tire noise performance and wet performance were evaluated for tire performance of the manufactured tires as described below.

To measure tire noise performance, pass-by noise was measured in conformance with ISO STANDARD: WD 13325-EU. The evaluation was carried out by taking the As can be seen from Table 1, tire noise performance was able to be enhanced while securing wet performance due to the crests being connected on the outer side when mounted on a vehicle, the troughs being connected on the inner side when mounted on a vehicle, and the lengths L1 and L2 being different from each other (Working Examples 1 and 2), and the balance between wet performance and tire noise performance was able to be enhanced in comparison to a case where the lengths L1 and L2 were equal to each other Comparative Examples 1 to 3

Moreover, by to the crests being connected on the outer side when mounted on a vehicle and the troughs being connected on the inner side when mounted on a vehicle (Working Example 1), wet performance was not greatly reduced and tire noise performance was able to be greatly enhanced in comparison to a case where the troughs were connected on the outer side when mounted on a vehicle and the crests were connected on the inner side when mounted on a vehicle (Working Example 2).

TABLE 2

|  |  | Working Example 3 | Working Example 4 | Working Example 5 | Working Example 6 | Working Example 7 |
|---|---|---|---|---|---|---|
| Main groove shape |  | Wave shape | Wave shape | Wave shape | Wave shape | Wave shape |
| Connection manner of lug grooves or the like | Outer side when mounted on vehicle | Crest - Crest | Crest - Crest | Crest - Crest | Crest - Crest | Crest - Crest |
|  | Inner side when mounted on vehicle | Trough - Trough | Trough - Trough | Trough - Trough | Trough - Trough | Trough - Trough |
| L1/L2 |  | 1.03 | 1.05 | 1.13 | 1.20 | 1.22 |
| Tire noise performance |  | 103 | 106 | 108 | 106 | 103 |
| Wet performance |  | 103 | 104 | 105 | 104 | 103 |

As can be seen in Table 2, the balance between the reduction in tire noise and the enhancement in wet performance can be maintained at a higher level by the ratio L1/L2 between the first length L1 and the second length L2 satisfying a range of 1.05 to 1.20 (Working Examples 4 to 6) in comparison to a case where the ratio L1/L2 is less than 1.05 (Working Example 3) or greater than 1.20 (Working Example 7).

Cases where the index values of tire noise performance and wet performance are equal to or greater than 104 in Table 2 were evaluated as maintaining at a higher level the balance between the reduction in tire noise and the enhancement in wet performance.

TABLE 3

|  |  | Working Example 8 | Working Example 9 | Working Example 10 |
|---|---|---|---|---|
| Main groove shape |  | Wave shape | Wave shape | Wave shape |
| Connection manner of lug grooves or the like | Outer side when mounted on vehicle | Crest - Crest | Crest - Crest | Crest - Crest |
|  | Inner side when mounted on vehicle | Trough - Trough | Trough - Trough | Trough - Trough |
| Sipe width/Groove width |  | 0.8 | 1.0 | 1.2 |
| Edge connection of chamfered sipe and lug groove |  | Step | No step | Step |
| Tire noise performance |  | 103 | 108 | 103 |
| Wet performance |  | 100 | 105 | 107 |

"Edge connection of chamfered sipe and lug groove" in Table 3 indicates the connection manner of the edge of the lug groove adjoining the land portion and the edge where the chamfer of the sipe adjoins the land portion in the lug groove and sipe combination on the tread surface. "Sipe width/Groove width" indicates a ratio of the sipe width to the groove width of the lug groove.

As can be seen in Table 3, wet performance was not greatly reduced and tire noise performance was able to be enhanced when the edge of the lug groove adjoining the land portion and the edge where the chamfer of the sipe adjoins the land portion in the lug groove and sipe combination were connected without a step (Working Example 9) in comparison to when the edges were connected with a step (Working Example 8, 10).

TABLE 4

|  |  | Working Example 11 | Working Example 12 | Working Example 13 |
|---|---|---|---|---|
| Main groove shape |  | Wave shape | Wave shape | Wave shape |
| Connection manner of lug grooves or the like | Outer side when mounted on vehicle | Crest - Crest | Crest - Crest | Crest - Crest |
|  | Inner side when mounted on vehicle | Trough - Trough | Trough - Trough | Trough - Trough |
| Land portion width |  | 23w < 25w | 25w = 23w | 23w > 25w |
| Tire noise performance |  | 105 | 108 | 111 |
| Wet performance |  | 108 | 105 | 102 |

"Land portion width" row in Table 4 indicates the size relationships between the widths $23w$, $25w$ of the two land portions 23, 25. "$23w$" and "$25w$" indicate the widths $23w$, $25w$ of the land portions 23, 25, respectively.

As can be seen in Table 4, the balance between the reduction in tire noise and the enhancement in wet performance was able to be maintained at an even higher level and, in particular, a superior effect of tire noise reduction was demonstrated when the widths $23w$, $25w$ of the land portions 23, 25 are equal to each other (Working Example 12).

TABLE 5

|  | Working Example 14 | Working Example 15 | Working Example 16 | Working Example 17 | Working Example 18 |
|---|---|---|---|---|---|
| Main groove shape | Wave shape | Wave shape | Wave shape | Wave shape | Wave shape |

TABLE 5-continued

|  |  | Working Example 14 | Working Example 15 | Working Example 16 | Working Example 17 | Working Example 18 |
|---|---|---|---|---|---|---|
| Connection manner of lug grooves or the like | Outer side when mounted on vehicle | Crest - Crest | Crest - Crest | Crest - Crest | Crest - Crest | Crest - Crest |
|  | Inner side when mounted on vehicle | Trough - Trough | Trough - Trough | Trough - Trough | Trough - Trough | Trough - Trough |
| Circumferential main groove width sum/ Ground contact width | | 15% | 23% | 28% | 32% | 40% |
| Tire noise performance | | 113 | 110 | 108 | 106 | 103 |
| Wet performance | | 100 | 103 | 105 | 107 | 110 |

"Circumferential main groove width sum/ground contact width" in Table 5 indicates the percentage of the sum of the groove widths of the plurality of circumferential main grooves included in the wave-shaped circumferential main groove group relative to the tire ground contact width.

As can be seen in Table 5, wet performance was enhanced and a deterioration in tire noise was suppressed when the sum of the groove widths 13w, 15w, 17w satisfied a range of no less than 20% and no more than 35% of the ground contact width 11 (Working Examples 15 to 17).

The pneumatic tire of the present technology was described in detail above. However, it should be understood that the present technology is not limited to the above embodiments, but may be improved or modified in various ways so long as these improvements or modifications remain within the scope of the present technology.

What is claimed is:

1. A pneumatic tire provided with a tread pattern, wherein half-tread regions provided on both sides in a tire width direction of a tire center line in a tread pattern each including:
    a wave-shaped circumferential main groove group having a plurality of circumferential main grooves, the plurality of circumferential main grooves extending in a tire circumferential direction and including an outer circumferential main groove positioned on an outermost side in the tire width direction of the plurality of circumferential main grooves and an inner circumferential main groove positioned on an inner side in the tire width direction relative to the outer circumferential main groove, and the outer circumferential main groove and the inner circumferential main groove both having a fixed groove width and extending in a wave shape in the tire circumferential direction while fluctuating in the tire width direction;
    a wave-shaped land portion provided between the inner circumferential main groove and the outer circumferential main groove, the wave-shaped land portion having a fixed width in the tire width direction, and extending in the tire circumferential direction while edges fluctuate in the tire width direction due to the wave shape; and
    a plurality of lug grooves, a plurality of sipes, or a plurality of lug groove and sipe combinations each formed by combining a lug groove and a sipe, communicating with the outer circumferential main groove and the inner circumferential main groove in a region of the land portion;
    wherein,
    the lug grooves, the sipes, or the lug groove and sipe combinations are each configured in such a manner that, in the half-tread region on a first side in the tire width direction, a first crest having the wave shape at one end portion in the tire width direction of the land portion is connected to a second crest having the wave shape at an other end portion in the tire width direction of the land portion, and, in the half-tread region on a second side in the tire width direction, a first trough having the wave shape at one end portion in the tire width direction of the land portion is connected to a second trough having the wave shape at an other end portion in the tire width direction of the land portion, so that a first length in an extension direction of the lug grooves, the sipes, or the lug groove and sipe combinations each formed by combining the lug groove and the sipe in the half-tread region on the first side is greater than a second length in the extension direction of the lug grooves, the sipes, or the lug groove and sipe combinations in the half-tread region on the second side,
    all of the lug grooves, the sipes, or the lug groove and sipe combinations in the region of the land portion in the half-tread region on the first side are each configured in such a manner that the first crest is connected to the second crest,
    all of the lug grooves, the sipes, or the lug groove and sipe combinations in the region of the land portion in the half-tread region on the second side are each configured in such a manner that the first trough is connected to the second trough, and
    the inner circumferential main groove in the half-tread region on the first side is the same as the inner circumferential main groove in the half-tread region on the second side.

2. The pneumatic tire according to claim 1, wherein the lug groove and sipe combinations are provided in a region of the land portion in the half-tread region on the second side, and in each of the lug groove and sipe combinations,
    the sipe is provided with a chamfer along an extension direction of the sipe, so that a sipe width is greater toward a tread surface, and the sipe width on the tread surface equals to a groove width of the lug groove, and
    an edge where the lug groove adjoins the land portion and an edge where the chamfer adjoins the land portion are continuously connected without a step on the tread surface.

3. The pneumatic tire according to claim 1, wherein a sum of groove widths of the plurality of the circumferential main grooves in the wave-shaped circumferential main groove group provided in the tread pattern satisfies a range of 20 to 35% of a ground contact width, and bottom portions of the outer circumferential main groove and the inner circumferential main groove have a shape extending in a wave shape in the tire circumferential direction while fluctuating in the tire width direction with a period less than a period of the wave shape.

4. The pneumatic tire according to claim 1, wherein a shoulder land portion is provided on an outer side in the tire width direction of the outer circumferential main groove in the half-tread region on the first side, and
a shoulder lug groove that does not communicate with the outer circumferential main groove is provided in a region of the shoulder land portion in the half-tread region on the first side.

5. The pneumatic tire according to claim 1, wherein a shoulder land portion is provided on an outer side in the tire width direction of the outer circumferential main groove in the half-tread region on the second side, and
a shoulder sipe that communicates with the outer circumferential main groove is provided in a region of the shoulder land portion in the half-tread region on the second side.

6. The pneumatic tire according to claim 1, wherein a width of the land portion in the half-tread region on the first side equals to a width of the land portion in the half-tread region on the second side.

7. The pneumatic tire according to claim 1, wherein the lug groove and sipe combinations are provided in a region of the land portion, and
the lug groove and sipe combinations are provided only in the region of the land portion in the half-tread region on the second side.

8. A pneumatic tire provided with a tread pattern, wherein half-tread regions provided on both sides in a tire width direction of a tire center line in a tread pattern each including:
a wave-shaped circumferential main groove group having a plurality of circumferential main grooves, the plurality of circumferential main grooves extending in a tire circumferential direction and including an outer circumferential main groove positioned on an outermost side in the tire width direction of the plurality of circumferential main grooves and an inner circumferential main groove positioned on an inner side in the tire width direction relative to the outer circumferential main groove, and the outer circumferential main groove and the inner circumferential main groove both having a fixed groove width and extending in a wave shape in the tire circumferential direction while fluctuating in the tire width direction;
a wave-shaped land portion provided between the inner circumferential main groove and the outer circumferential main groove, the wave-shaped land portion having a fixed width in the tire width direction, and extending in the tire circumferential direction while edges fluctuate in the tire width direction due to the wave shape; and
a plurality of lug grooves, a plurality of sipes, or a plurality of lug groove and sipe combinations each formed by combining a lug groove and a sipe, communicating with the outer circumferential main groove and the inner circumferential main groove in a region of the land portion; wherein,
the lug grooves, the sipes, or the lug groove and sipe combinations are each configured in such a manner that, in the half-tread region on a first side in the tire width direction, a first crest having the wave shape at one end portion in the tire width direction of the land portion is connected to a second crest having the wave shape at an other end portion in the tire width direction of the land portion, and, in the half-tread region on a second side in the tire width direction, a first trough having the wave shape at one end portion in the tire width direction of the land portion is connected to a second trough having the wave shape at an other end portion in the tire width direction of the land portion, so that a first length in an extension direction of the lug grooves, the sipes, or the lug groove and sipe combinations each formed by combining the lug groove and the sipe in the half-tread region on the first side is greater than a second length in the extension direction of the lug grooves, the sipes, or the lug groove and sipe combinations in the half-tread region on the second side,
all of the lug grooves, the sipes, or the lug groove and sipe combinations in the region of the land portion in the half-tread region on the first side are each configured in such a manner that the first crest is connected to the second crest,
all of the lug grooves, the sipes, or the lug groove and sipe combinations in the region of the land portion in the half-tread region on the second side are each configured in such a manner that the first trough is connected to the second trough,
the inner circumferential main groove in the half-tread region on the first side is the same as the inner circumferential main groove in the half-tread region on the second side,
a tire mounting orientation for mounting toward a vehicle outer side is predetermined for the pneumatic tire, and
the first side is disposed on the vehicle outer side.

9. The pneumatic tire according to claim 8, wherein a ratio of the first length on the first side to the second length on the second side satisfies a range of 1.05 to 1.20.

10. A pneumatic tire provided with a tread pattern, wherein half-tread regions provided on both sides in a tire width direction of a tire center line in a tread pattern each including:
a wave-shaped circumferential main groove group having a plurality of circumferential main grooves, the plurality of circumferential main grooves extending in a tire circumferential direction and including an outer circumferential main groove positioned on an outermost side in the tire width direction of the plurality of circumferential main grooves and an inner circumferential main groove positioned on an inner side in the tire width direction relative to the outer circumferential main groove, and the outer circumferential main groove and the inner circumferential main groove both having a fixed groove width and extending in a wave shape in the tire circumferential direction while fluctuating in the tire width direction;
a wave-shaped land portion provided between the inner circumferential main groove and the outer circumferential main groove, the wave-shaped land portion having a fixed width in the tire width direction, and extending in the tire circumferential direction while edges fluctuate in the tire width direction due to the wave shape; and
a plurality of lug grooves, a plurality of sipes, or a plurality of lug groove and sipe combinations each formed by combining a lug groove and a sipe, communicating with the outer circumferential main groove and the inner circumferential main groove in a region of the land portion; wherein,
the lug grooves, the sipes, or the lug groove and sipe combinations are each configured in such a manner that, in the half-tread region on a first side in the tire width direction, a first crest having the wave shape at one end portion in the tire width direction of the land portion is connected to a second crest having the wave shape at an other end portion in the tire width direction of the land portion, and, in the half-tread region on a second side in the tire width direction, a first trough having the wave shape at one end portion in the tire width direction of the land portion is connected to a second trough having the wave shape at an other end portion in the tire width direction of the land portion, so that a first length in an extension direction of the lug grooves, the sipes, or the lug groove and sipe combinations each formed by combining the lug groove and the sipe in the half-tread region on the first side is greater than a second length in the extension direction of the lug grooves, the sipes, or the lug groove and sipe combinations in the half-tread region on the second side, all of the lug grooves, the sipes, or the lug groove and sipe combinations in the region of the land portion in the half-tread region on the first side are each configured in such a manner that the first crest is connected to the second crest, all of the lug grooves, the sipes, or the lug groove and sipe combinations in the region of the land portion in the half-tread region on the second side are each configured in such a manner that the first trough is connected to the second trough, the inner circumferential main groove in the half-tread region on the first side is the same as the inner circumferential main groove in the half-tread region on the second side, and the pneumatic tire comes into contact with ground in a state where a camber angle relative to the ground is in a negative camber.

11. The pneumatic tire according to claim 10, wherein a ratio of the first length on the first side to the second length on the second side satisfies a range of 1.05 to 1.20.

12. The pneumatic tire according to claim 11, wherein the lug groove and sipe combinations are provided in a region of the land portion in the half-tread region on the second side, and in each of the lug groove and sipe combinations,
the sipe is provided with a chamfer along an extension direction of the sipe, so that a sipe width is greater toward a tread surface, and the sipe width on the tread surface equals to a groove width of the lug groove, and
an edge where the lug groove adjoins the land portion and an edge where the chamfer adjoins the land portion are continuously connected without a step on the tread surface.

13. A pneumatic tire provided with a tread pattern, wherein half-tread regions provided on both sides in a tire width direction of a tire center line in a tread pattern each including:

a wave-shaped circumferential main groove group having a plurality of circumferential main grooves, the plurality of circumferential main grooves extending in a tire circumferential direction and including an outer circumferential main groove positioned on an outermost side in the tire width direction of the plurality of circumferential main grooves and an inner circumferential main groove positioned on an inner side in the tire width direction relative to the outer circumferential main groove, and the outer circumferential main groove and the inner circumferential main groove both having a fixed groove width and extending in a wave shape in the tire circumferential direction while fluctuating in the tire width direction;

a wave-shaped land portion provided between the inner circumferential main groove and the outer circumferential main groove, the wave-shaped land portion having a fixed width in the tire width direction, and extending in the tire circumferential direction while edges fluctuate in the tire width direction due to the wave shape; and a plurality of lug grooves, a plurality of sipes, or a plurality of lug groove and sipe combinations each formed by combining a lug groove and a sipe, communicating with the outer circumferential main groove and the inner circumferential main groove in a region of the land portion; wherein, the lug grooves, the sipes, or the lug groove and sipe combinations are each configured in such a manner that, in the half-tread region on a first side in the tire width direction, a first crest having the wave shape at one end portion in the tire width direction of the land portion is connected to a second crest having the wave shape at an other end portion in the tire width direction of the land portion, and, in the half-tread region on a second side in the tire width direction, a first trough having the wave shape at one end portion in the tire width direction of the land portion is connected to a second trough having the wave shape at an other end portion in the tire width direction of the land portion, so that a first length in an extension direction of the lug grooves, the sipes, or the lug groove and sipe combinations each formed by combining the lug groove and the sipe in the half-tread region on the first side is greater than a second length in the extension direction of the lug grooves, the sipes, or the lug groove and sipe combinations in the half-tread region on the second side, the lug groove and sipe combinations are provided in a region of the land portion in the half-tread region on the second side, the inner circumferential main groove in the half-tread region on the first side is the same as the inner circumferential main groove in the half-tread region on the second side, and in each of the lug groove and sipe combinations,
the sipe is provided with a chamfer along an extension direction of the sipe, so that a sipe width is greater toward a tread surface, and the sipe width on the tread surface equals to a groove width of the lug groove,
an edge where the lug groove adjoins the land portion and an edge where the chamfer adjoins the land portion are continuously connected without a step on the tread surface, and
a center position in a direction of the sipe width of the sipe and a center position in a direction of the groove width of the lug grooves match at a connection position of the lug groove and the sipe.

14. A pneumatic tire provided with a tread pattern, wherein half-tread regions provided on both sides in a tire width direction of a tire center line in a tread pattern each including:

a wave-shaped circumferential main groove group having a plurality of circumferential main grooves, the plurality of circumferential main grooves extending in a tire circumferential direction and including an outer circumferential main groove positioned on an outermost side in the tire width direction of the plurality of circumferential main grooves and an inner circumferential main groove positioned on an inner side in the tire width direction relative to the outer circumferential main groove, and the outer circumferential main groove and the inner circumferential main groove both having a fixed groove width and extending in a wave shape in the tire circumferential direction while fluctuating in the tire width direction;

a wave-shaped land portion provided between the inner circumferential main groove and the outer circumferential main groove, the wave-shaped land portion having a fixed width in the tire width direction, and extending in the tire circumferential direction while edges fluctuate in the tire width direction due to the wave shape; and a plurality of lug grooves, a plurality of sipes, or a plurality of lug groove and sipe combinations each formed by combining a lug groove and a sipe, communicating with the outer circumferential main groove and the inner circumferential main groove in a region of the land portion; wherein, the lug grooves, the sipes, or the lug groove and sipe combinations are each configured in such a manner that, in the half-tread region on a first side in the tire width direction, a first crest having the wave shape at one end portion in the tire width direction of the land portion is connected to a second crest having the wave shape at an other end portion in the tire width direction of the land portion, and, in the half-tread region on a second side in the tire width direction, a first trough having the wave shape at one end portion in the tire width direction of the land portion is connected to a second trough having the wave shape at an other end portion in the tire width direction of the land portion, so that a first length in an extension direction of the lug grooves, the sipes, or the lug groove and sipe combinations each formed by combining the lug groove and the sipe in the half-tread region on the first side is greater than a second length in the extension direction of the lug grooves, the sipes, or the lug groove and sipe combinations in the half-tread region on the second side, the inner circumferential main groove in the half-tread region on the first side is the same as the inner circumferential main groove in the half-tread region on the second side, a tire mounting orientation for mounting toward a vehicle outer side is predetermined for the pneumatic tire, the first side is disposed on the vehicle outer side, the pneumatic tire comes into contact with ground in a state where a camber angle relative to the ground is in a negative camber, a ratio of the first length on the first side to the second length on the second side satisfies a range of 1.05 to 1.20, the lug groove and sipe combinations are provided in a region of the land portion in the half-tread region on the second side, and in each of the lug groove and sipe combinations,
the sipe is provided with a chamfer along an extension direction of the sipe, so that a sipe width is greater toward a tread surface, and the sipe width on the tread surface equals to a groove width of the lug groove, an edge where the lug groove adjoins the land portion and an edge where the chamfer adjoins the land portion are continuously connected without a step on the tread surface, and a center position in a direction of the sipe width of the sipe and a center position in a direction of the groove width of the lug groove match at a connection position of the lug groove and the sipe.

15. The pneumatic tire according to claim 14, wherein a sum of groove widths of the plurality of the circumferential main grooves in the wave-shaped circumferential main groove group provided in the tread pattern satisfies a range of 20 to 35% of a ground contact width, and bottom portions of the outer circumferential main groove and the inner circumferential main groove have a shape extending in a wave shape in the tire circumferential direction while fluctuating in the tire width direction with a period less than a period of the wave shape.

16. The pneumatic tire according to claim 15, wherein a shoulder land portion is provided on an outer side in the tire width direction of the outer circumferential main groove in the half-tread region on the first side, and a shoulder lug groove that does not communicate with the outer circumferential main groove is provided in a region of the shoulder land portion in the half-tread region on the first side.

17. The pneumatic tire according to claim 16, wherein a shoulder land portion is provided on an outer side in the tire width direction of the outer circumferential main groove in the half-tread region on the second side, and a shoulder sipe that communicates with the outer circumferential main groove is provided in a region of the shoulder land portion in the half-tread region on the second side.

18. The pneumatic tire according to claim 17, wherein a width of the land portion in the half-tread region on the first side equals to a width of the land portion in the half-tread region on the second side.

* * * * *